UNITED STATES PATENT OFFICE.

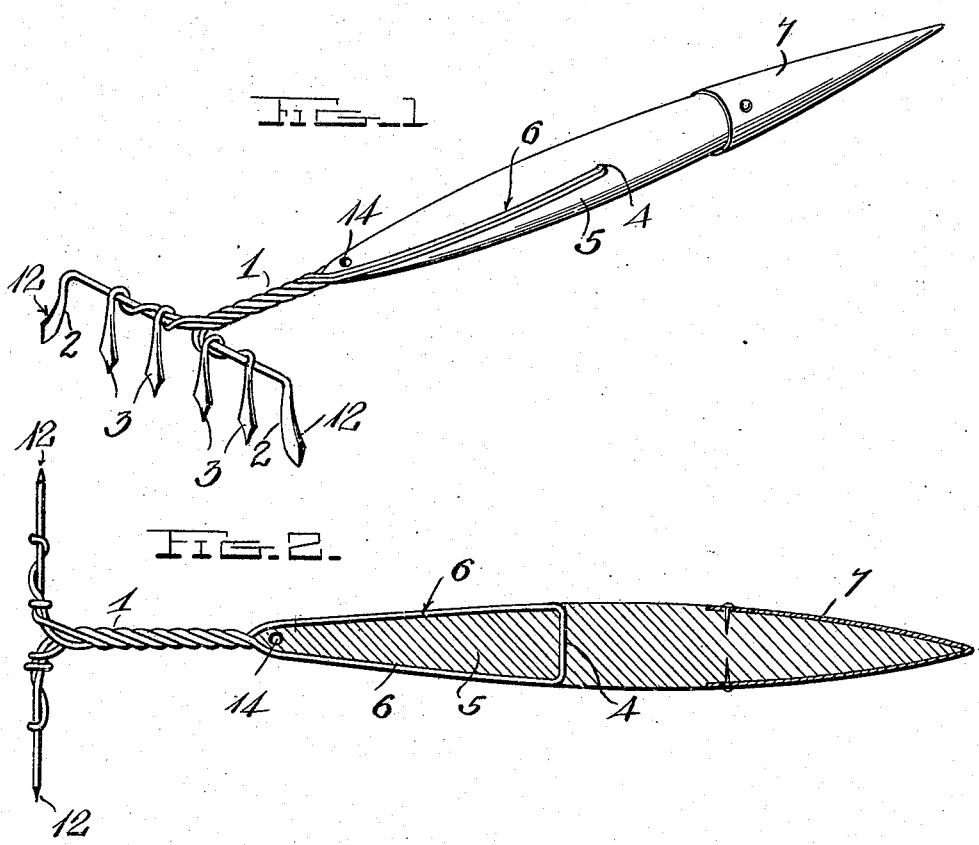

HENRY LAWRENCE HUGHES, OF FAYETTE, MISSOURI.

HAND WEEDING AND TRANSPLANTING IMPLEMENT.

933,304.   Specification of Letters Patent.   Patented Sept. 7, 1909.

Application filed March 8, 1909. Serial No. 482,068.

*To all whom it may concern:*

Be it known that I, HENRY L. HUGHES, a citizen of the United States, residing at Fayette, in the county of Howard and State of Missouri, have invented certain new and useful Improvements in Hand Weeding and Transplanting Implements; and I do declare the following to be a full, clear, and exact description of the invention, such as will enable others skilled in the art to which it appertains to make and use the same.

This invention relates to improvements in hand weeding and transplanting implements.

The object of the invention is to provide a device of this character adapted for use in cultivating plants and for making holes in the ground for transplanting the same.

A further object is to provide a device of this character which will be simple, strong and durable in construction, efficient in operation and so constructed as to prevent the separation of the same from its handle.

With the foregoing and other objects in view, the invention consists of certain novel features of construction, combination and arrangement of parts, as will be more fully described and particularly pointed out in the appended claims.

In the accompanying drawings, Figure 1 is a perspective view of a weeding and transplanting implement constructed in accordance with the invention; Fig. 2 is a top plan view of the same showing the handle in horizontal section.

My improved weeding and transplanting implement comprises a shank 1 formed of a plurality of wire rods twisted together. At the outer end of the shank, one half of the wire rods are bent laterally in one direction and the other half are bent laterally in the opposite direction. One of the laterally bent rods on each side of the shank is bent downwardly at right angles to form the outer teeth of the cultivating implement. Each of the other laterally bent wire rods on the opposite sides of the shank are twisted around the rod forming the outer teeth and are bent downwardly at right angles to form the intermediate cultivating teeth 3. The ends of the outer teeth 2 and the intermediate teeth 3 are preferably flattened and pointed, as shown, to facilitate the engagement thereof with the soil.

Before twisting together, the wire rods forming the shank are inserted through a hole 4 in the handle 5. In the opposite sides of the outer end of the handle are formed longitudinally disposed grooves 6 which are provided to receive the wire rods which are engaged therewith, after being passed through the hole 4 in the handle. By thus connecting the shank to the handle, the shank and teeth will be securely held in operative position. The hole 4 and the grooves 6 may be closed with white lead or putty after the wire rods are engaged therewith, thereby preventing the decaying of the handle.

The handle 4 may be of any suitable size and length and on the outer end of the same is secured a dibble 7. The dibble 7 is formed of galvanized or non-corrosive metal, so that it will not rust when used in wet soil. The dibble may be constructed in any suitable manner and is tapered to a sharp point and is secured to the outer end of the handle in any suitable manner.

The teeth and shank of the implement are preferably formed of galvanized wire rods so that they will not rust and by forming the same of different sizes and with various numbers of teeth, an efficient tool is provided for cultivating or preparing the ground for seeds or plants, or for removing weeds and grass from the soil.

In the construction of the weeder, I preferably curve the outer teeth outwardly and provide said curved outer teeth with a sharp outer cutting edge as shown at 12. This sharp edge is of great advantage in cutting out weeds. The dibble on the end of the handle will be found useful in making holes for transplanting small plants and also in forming drills for sowing fine seeds.

Having thus described my invention, what I claim as new and desire to secure by Letters-Patent is:

1. A hand weeding and transplanting implement comprising a handle having longitudinally disposed grooves formed in the opposite sides, and a transverse aperture at the ends of said grooves, a shank formed of a plurality of twisted wire rods, said rods being bent laterally in opposite directions at one end of the shank, a series of teeth formed by the right angularly bent ends of said laterally projecting portions of the shank, handle engaging portions formed at the opposite end of the shank, said handle engaging portions being adapted to engage the grooves in the sides of the handle and to pass through said transverse aperture.

2. A weeding and transplanting implement comprising a handle provided with a transverse aperture between its ends and longitudinal grooves in opposite sides extending from said aperture to its inner end, a shank formed of a plurality of wire rods passed through the aperture of the handle and then in the side grooves thereof and twisted together near their outer ends to form a shank which in turn forms a longitudinal continuation of the handle, and a series of alining teeth formed by bending the outer ends of the wire rods laterally and downwardly and flattening the downwardly bent portions.

3. A weeding and transplanting implement comprising a handle provided with a transverse aperture between its ends, a shank formed of a plurality of wire rods passed through the aperture of the handle and twisted together near their outer ends, end teeth formed by bending two of the wire rods laterally in opposite directions and then downwardly and flattening the downwardly bent portions, and a series of intermediate teeth formed by passing the remaining wire rods around the outwardly bent portions of the other rods and then downwardly and flattening the downwardly bent portions.

In testimony whereof I have hereunto set my hand in presence of two subscribing witnesses.

HENRY LAWRENCE HUGHES.

Witnesses:
A. L. KIRBY,
JAMES T. SCOTT.